(12) United States Patent
Kobylinski (10) Patent No.: US 9,828,145 B2
(45) Date of Patent: Nov. 28, 2017

(54) LOCKABLE BOTTLE STOPPER

(71) Applicant: Thomas Kobylinski, Clarence Center, NY (US)

(72) Inventor: Thomas Kobylinski, Clarence Center, NY (US)

(*) Notice: Subject to any disclaimer, the term of this patent is extended or adjusted under 35 U.S.C. 154(b) by 0 days.

(21) Appl. No.: 15/242,554

(22) Filed: Aug. 21, 2016

(65) Prior Publication Data

US 2017/0050778 A1    Feb. 23, 2017

Related U.S. Application Data (60) Provisional application No. 62/207,654, filed on Aug. 20, 2015.

(51) Int. Cl.
*B65D 39/12* (2006.01)
*B65D 55/14* (2006.01)

(52) U.S. Cl.
CPC ............. *B65D 39/12* (2013.01); *B65D 55/14* (2013.01)

(58) Field of Classification Search
CPC ........ B65D 39/12; B65D 39/00; B65D 55/14; B65D 55/02; B65D 51/24; B65D 50/067; B65D 50/068; B65D 50/046; B65D 43/0214; F16L 55/132; F16L 55/13; F16L 55/11
USPC ....... 215/212, 211, 207, 201, 228, 358, 364, 215/355; 220/210, 212, 789, 804, 801, 220/796; 138/89; 70/21, 20
See application file for complete search history.

(56) References Cited

U.S. PATENT DOCUMENTS

| | | | | |
|---|---|---|---|---|
| 1,448,051 A | * | 3/1923 | Borne | B65D 39/12 |
| | | | | 215/360 |
| 2,372,566 A | * | 3/1945 | Gazley | F16B 21/02 |
| | | | | 235/61 P |
| 2,701,398 A | * | 2/1955 | Bohmer | F16B 13/124 |
| | | | | 403/22 |
| 3,180,515 A | * | 4/1965 | Lindgren | B65D 39/12 |
| | | | | 215/269 |
| 3,339,952 A | * | 9/1967 | Beckman | F16B 5/02 |
| | | | | 403/217 |
| 3,820,675 A | * | 6/1974 | Malles | B65D 50/067 |
| | | | | 215/212 |
| 6,883,546 B1 | * | 4/2005 | Kobylinski | F16L 55/132 |
| | | | | 138/89 |
| 9,121,243 B1 | * | 9/2015 | Headifen | E21B 33/02 |

(Continued)

*Primary Examiner* — Robert J Hicks
(74) *Attorney, Agent, or Firm* — Patricia M. Costanzo (57) ABSTRACT

A lockable, reusable plug for hermetically-sealing an opening, such as an alcoholic beverage bottle consists of a threaded wing bolt with an opening therethrough and a threaded stem; a domed, shouldered cap having an axial bore, an elastomeric sealing gasket having an opening, and a base nut having a threaded axial bore for mating with the threaded stem. Positioning the gasket between the compression cap and compression base nut, the bolt is inserted through the assembly, making the plug ready for insertion into an opening to be sealed. A flange on the gasket and the cap support the plug on the rim of the opening to be sealed. Screwing the bolt further into the assembly urges the plates toward one another compressing and causing the gasket to extend radially outward creating the seal. Insert the shackle of padlock through opening of bolt, lock padlock, shoulders prevent removal of plug.

17 Claims, 9 Drawing Sheets

(56) References Cited

U.S. PATENT DOCUMENTS

2008/0116165 A1* 5/2008 Lin .................. B65D 39/12
                                                                              215/294

* cited by examiner

LOCKABLE BOTTLE STOPPER

CROSS-REFERENCE TO RELATED APPLICATIONS

This is a Non-Provisional of Provisional 62/207,654 filed on Aug. 20, 2015.

STATEMENT REGARDING FEDERALLY SPONSORED RESEARCH OR DEVELOPMENT

Not Applicable

REFERENCE TO SEQUENCE LISTING, A TABLE OR A COMPUTER PROGRAM LISTING COMPACT DISK APPENDIX

Not Applicable

BACKGROUND OF THE INVENTION

The invention is generally related to stoppers for containers and such, and more particularly, related to air-tight, lockable bottle stoppers.

The background information discussed below is presented to better illustrate the novelty of the present invention. This background information is not admitted prior art.

Cocktail culture is making a comeback. Those who used to have just an occasional beer or glass of wine are now enjoying drinks such as, passion fruit mojito, muddled lemonade, and a plethora of martinis. These colorful, often fruity and sweet drinks appeal not only to us, but their often candy dessert like properties are often noticed by children, especially teenaged children who think drinking such brightly colored, sweet alcoholic concoctions is a cool thing to do. Marketers of such products know how attractive and tempting these attractive looking and fruity tasting beverages are to teenagers, as well as to grown-ups, and are deliberately advertising to entice teens as well as their parents. After all, alcohol manufacturers know that teens will soon be consumers, too. Society's growing use of wine and alcoholic fruity coolers means that the liquor cabinet not only has more in it, but that what is in it is tantalizing to underage drinkers.

Most parents believe that they can trust their children to do the right thing and make good decisions. However, it is well-known that most teens will test, and many will abuse, alcohol. As early as the eighth grade, some youngsters report that they are drinking regularly, as alcohol is the drug of choice among young people. And sadly, studies show that using alcohol and tobacco at a young age increases the risk for the use of other drugs. Additionally, the use of alcohol combined with their lack of experience makes teenage drinking and driving dangerous for everyone. Alcohol-related car crashes are a leading cause of death for teenagers and young adults. Additionally, alcohol use is involved in many drowning accidents, suicides, homicides, and injuries. These facts have led most states to make it illegal to provide alcohol to minors who are not members of the family.

Thus, teen drinking is not as much an issue of trusting your child as it is a safety issue. Additionally, liability laws provide that if a minor, who is not a member of your family, gets into your unsecured liquor stock even without your permission, you may be liable if there is an accident. It comes down to making sure that all liquor in the home is kept securely unavailable for misuse. One way this can be accomplished is to keep the liquor cabinet locked. Liquor may also be made unavailable by buying only what you will consume that day. As we know though, most people do not have a lockable liquor cabinet and seldom do we shop one day at a time.

SUMMARY

Even when unused alcohol is kept in a securely locked cabinet, the present Inventor recognized that opened bottles of alcohol must be re-sealed in an air-tight manner to prevent the alcohol from either evaporating or going bad, or both. And, as there is a need for a bottle stopper to securely reseal an open bottle, in addition to a need for a means to keep the alcohol secured from use by un-authorized drinkers, the present Inventor formed an inventive concept that provides for a lockable hermetically-sealing stopper that securely seals and locks opened bottles containing alcohol. Based on his inventive concept, the present Inventor formulated inventive principles that provide for a stopper that seals a container hermetically and comprises a locking device for locking the stopper in the container opening to be sealed. The principles include providing a stopper that completely and securely seals an opened container with an air-tight seal, a stopper that is not negatively affected by pressures acting on the it, such as those produced by gas forming in the container that could force the stopper partially or completely out of the opening. Another principle is to have the stopper made with smooth sides, that is the stopper should not to be threaded to prevent a less-than-complete seal forming due to the presence of the spacing of threads. Such an imperfect seal could permit liquids or gases to escape. Also, the stoppers of the present invention are contemplated to not comprise an inflatable stopper body as such are especially susceptible to leakage.

Accordingly, the present invention is of a lockable hermetically-sealing stopper that protects against leakage of liquids or gases and is able to be opened only by those who are entitled to remove the stopper. The material used to manufacture the stopper of the present invention provides for the stopper to expand upon a change of ambient conditions, such as heating or the production of gas inside the container. The material used to manufacture the stopper also provides for the stopper to contract if the sealed opening should contract. Additionally, the stopper is of simple, easy to make construction, often having all parts made by molding techniques, is easy to use, reusable, not subject to rot or microbial degradation, does not transfer aromas, and is economical to manufacture.

An example of a lockable compression plug for hermetically sealing an opening in a part, comprises a threaded wing bolt having an opening therethrough, said bolt inserted through: a compression cap having a set of opposing spaced shoulders on a first surface and an axial bore therethrough to receive the threaded wing bolt, a sealing gasket having a central opening therethrough for receiving the winged threaded bolt, and a compression base nut having a threaded axial bore for mating with the threads of the threaded wing bolt; wherein after the plug is inserted into the opening in a part, the threaded wing bolt is further rotated through the threaded axial bore urging the compression capping plate and the compression base plate toward one another compressing the gasket causing the gasket to deform radially outward providing a hermetic seal in the opening in a part. Additionally, the opening therethrough the threaded wing bolt is structured to receive a shackle of a padlock wherein after the plug is inserted into the opening in a part, the gasket is deformed radially outward, the shackle of the padlock is inserted into the opening therethrough the threaded wing bolt, and the padlock is locked, the set of opposing spaced shoulders precludes rotation of the winged threaded bolt securing the plug in the opening in a part. The compression cap is often domed and has an outer diameter greater than the opening to be sealed. A flange of the sealing gasket has a first side, the first flange side positioned adjacent to a second side of compression cap, the flange having an outer diameter greater than the opening to be sealed. The sealing gasket comprises an elongate sleeve-like body, and the body has an outer diameter selected for complemental fitting of the gasket body inside the opening to be sealed. The threaded wing bolt has distorted threads at the end of the bolt, the distorted threads incapable of interaction with the interior threads of the base nut bore. The lockable compression plug is reusable. And, the opening in a part can be an opening in a bottle. There is a method for hermetically sealing an opening in a part using a lockable sealing stopper that comprising the steps of: providing a threaded wing bolt having an opening therethrough, the bolt inserted through: a compression cap having a set of opposing spaced shoulders on a first surface and an axial bore therethrough to receive the threaded wing bolt, providing a sealing gasket having a central opening therethrough for receiving the winged threaded bolt, and providing a compression base nut having a threaded axial bore for mating with the threads of the threaded wing bolt; wherein after the plug is inserted into the opening in a part, the threaded wing bolt is further rotated through the threaded axial bore urging the compression cap and the compression base nut toward one another compressing the gasket causing the gasket to deform radially outward providing a hermetic seal in the opening in a part. The method for hermetically sealing an opening in a part using a lockable sealing stopper also comprises the steps of: providing a shackle to be inserted into the opening is the bolt, wherein when the padlock is locked, the set of opposing spaced shoulders precludes rotation of the winged threaded bolt securing the plug in the opening in a part. In most instances the compression capping plate is domed.

BRIEF DESCRIPTION OF THE DRAWINGS

In order that these and other objects, features, and advantages of the present invention, may be more fully comprehended, the invention will now be described, by way of example, with reference to the accompanying drawings, wherein like reference characters indicate like parts throughout the several figures, and in which.

A LIST OF THE REFERENCE NUMBERS AND RELATED PARTS OF THE INVENTION

10 Lockable sealing stopper, also referred to as a compression plug.
12 Threaded lock-acceptable wing bolt.
14 Wings of winged section of threaded wing bolt 12.
16 Stem section of wing bolt 12.
16a Threads of threaded wing bolt 12.
20 Opening of wing bolt 12 into which padlock is inserted.
22 Shoulder of double-shouldered compression cap 30.
24 Axial bore through domed compression cap 30.
26 Base plate, also referred to as compression capping plate, of compression cap 30.
28 Dome of compression cap 30.
30 Domed compression cap with opposing shoulders 20.
40 Sealing gasket.
42 Flange of gasket 40.
44 Opening of gasket 40.
46 Sleeve of gasket 40.
50 Compression base nut.
54 Threaded axial bore of base compression nut 50.
55 Threads of axial bore 54.
64 Enlarged end of stem 16.
66 Distorted threads of stem 16.
70 Lock.
75 Optional tethering device.
100 Bottle.
110 Concrete.
120 Pipe.

It should be understood that the drawings are not necessarily to scale. In certain instances, details which are not necessary for an understanding of the present invention or which render other details difficult to perceive may have been omitted. It should be understood, of course, that the invention is not limited to the particular embodiments illustrated herein, but encompasses many embodiments.

DEFINITIONS

Container, as used herein, is typically made of glass or plastic having a narrow neck that is used for storing drinks or other liquids and includes bottles.

Hermetic sealing maintains a seal against the flow of liquids or gases. It is used to seal foods, pharmaceuticals, chemicals and consumer goods. Hermetic sealing is used with containers such as glass, aluminum cans, metal foils, and high barrier plastics, in addition to providing a seal for piping, such as drain and vent pipes made of most any suitable material and holes such as bore holes whether drilled in concrete or earth materials.

Plug, as used herein, is synonymous with stopper and the two terms are used interchangeably. A plug is an obstruction blocking or filling in an opening, a hole, etc.

DETAILED DESCRIPTION

Referring now particularly to the drawings, it should be noted that the disclosed invention is disposed to embodiments in various sizes, shapes, and forms, for example, embodiments change in size depending on their intended use as discussed herein. For example, a stopper of the present invention used as a lockable seal for a wine bottle would be scaled to fit the opening of such a bottle, whereas a stopper of the present invention to be used to seal a bore in the ground would be enlarged, accordingly. Therefore, the embodiments described herein are provided with the understanding that the present disclosure is intended as illustrative and is not intended to limit the invention to the embodiments described herein.

In short, the lockable, reusable plug for hermetically-sealing an opening, such as an alcoholic beverage bottle consists of a threaded wing bolt with an opening therethrough and a threaded stem; a domed, shouldered cap having an axial bore, an elastomeric sealing gasket having an opening, and a base nut having a threaded axial bore for mating with the threaded stem. Positioning the gasket between the compression cap and compression base nut, the bolt is inserted through the assembly, making the plug ready for insertion into an opening to be sealed. A flange on the gasket and the cap support the plug on the rim of the opening to be sealed. Screwing the bolt further into the assembly urges the plates toward one another compressing and causing the gasket to extend radially outward creating the seal. Insert the shackle of padlock through opening of bolt, lock padlock, shoulders prevent removal of plug.

FIGS. 1A to 4B illustrate the individual components of one example of the reusable lockable air-tight sealing compression plug following the inventive concept of the present invention. The reusable sealing compression plug 10 that hermetically seals an opened bottle, such as a wine bottle, includes novel structure that provides for the plug to be compressed and locked once inserted into the opening to be sealed. Once the expandable part of the plug is compressed, and thus expanded, and the plug is locked in its compressed state, the plug cannot be removed from the plugged bottle opening and provides a hermetic seal preventing liquids or gases from passing from the container through the stopper once the stopper is inserted into the opening and the seal formed.

Figure 4A:
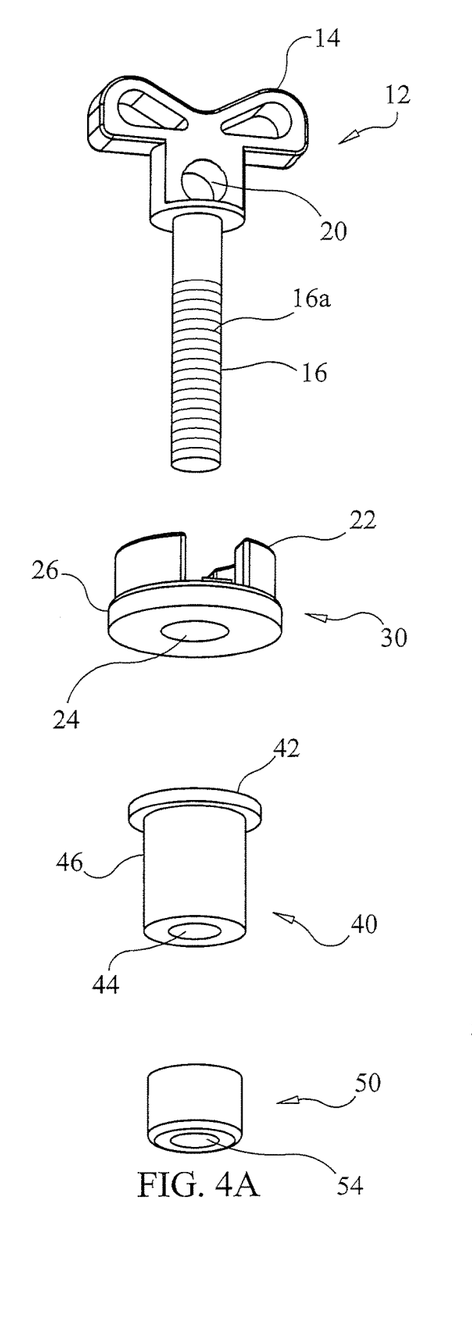
FIG. 4A is an upwardly angled exploded perspective view of an exemplar lockable hermetically sealable stopper as illustrated in FIG. 1A.
Figure 4B:
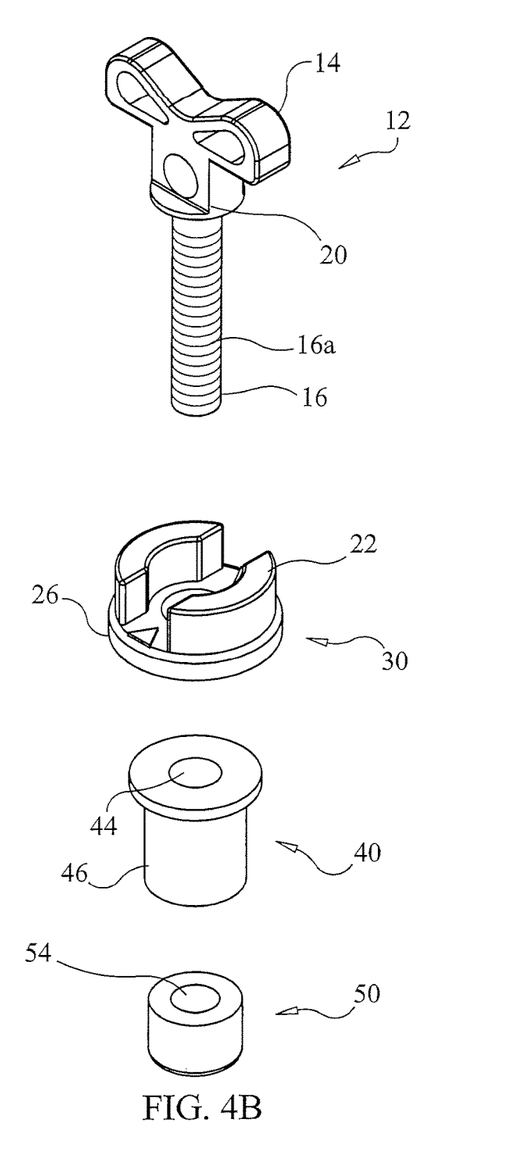
FIG. 4B is a downwardly angled exploded perspective view of an exemplar lockable hermetically sealable stopper as illustrated in FIG. 1A.

The four major components of stopper assembly 10 illustrated are threaded wing bolt 12 having an opening 20 therethrough, grasping wings 14 at a first end and at a second end there is stem 16 exteriorly threaded along its length extending downward from the mid-section between grasping wings 14; domed (see FIG. 7) compression cap 30 with opposing spaced shoulders 22, bore 24 therethrough and compression capping plate 26; resilient elastomeric sealing gasket 40 with opening 44, and compression base nut 50 with axial bore 54. The portion of winged threaded bolt 12 that extends downward from the area central to wings 14 contains thru-hole 20 (also referred to as an opening therethrough) for accepting a shackle of a padlock. In FIGS. 4A and 4B, stem 16 is shown positioned to be extended through bore 24, opening 44, and bore 54. Grasping wings 14 provide for an easy and secure grip to rotate bolt 16 to either tighten or loosen it, and thus, to close or open the seal by compressing or decompression gasket 40.

Figure 1A:
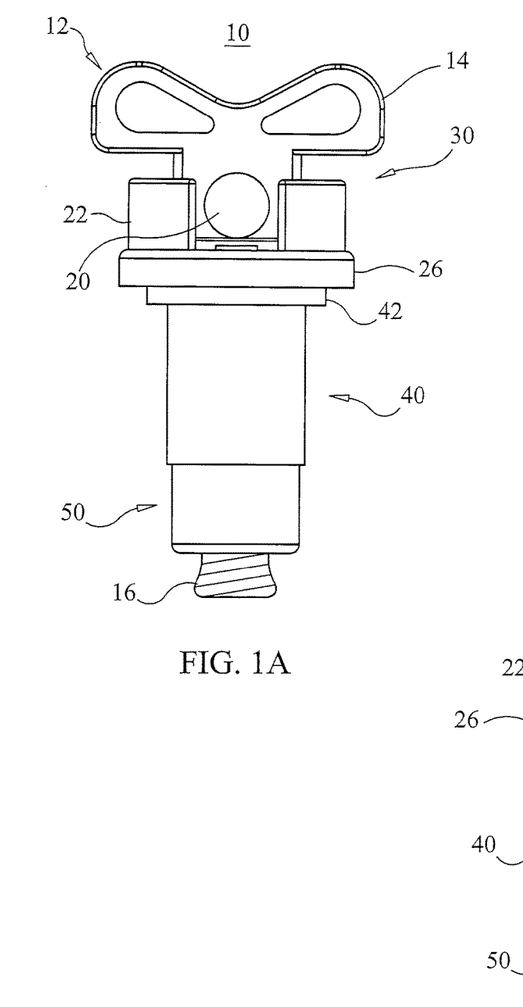
FIG. 1A is an elevation view of a completely assembled exemplar lockable hermetically sealable stopper in its lockable position.
Figure 1B:
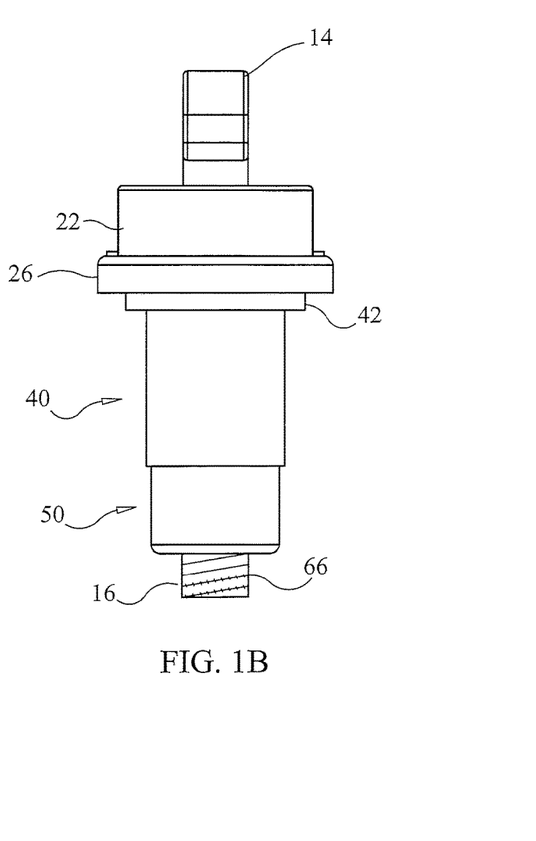
FIG. 1B is an elevation view of an exemplar lockable hermetically sealable stopper turned 90° from the view seen in FIG. 1A.
Figure 1C:
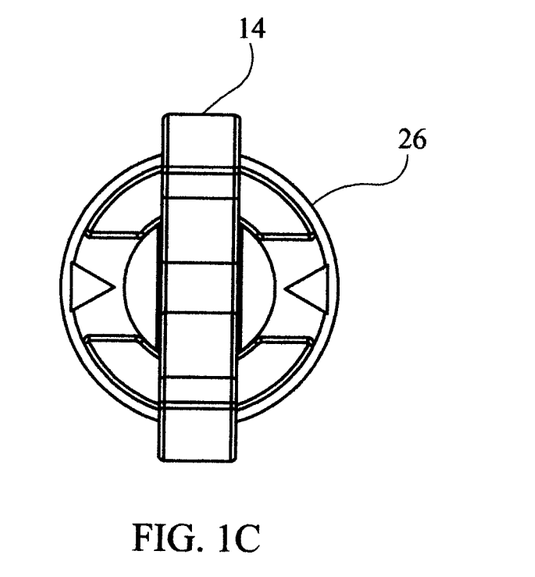
FIG. 1C is a plan view of the top of an exemplar lockable hermetically sealable stopper in its lockable position.
Figure 1D:
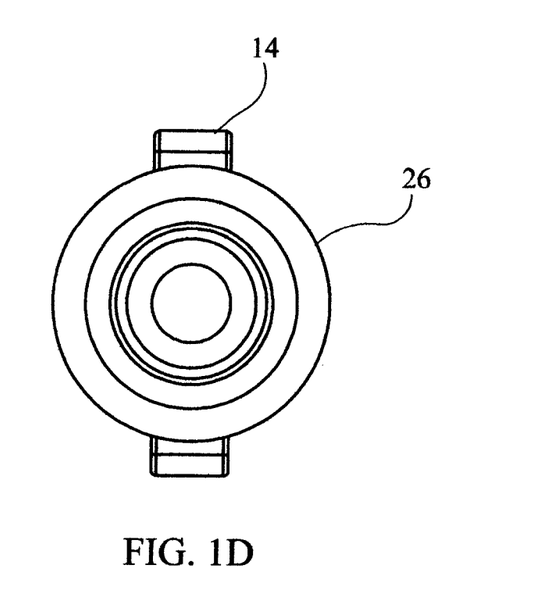
FIG. 1D is a plan view of the bottom of an exemplar lockable hermetically sealable stopper.
Figure 2A:
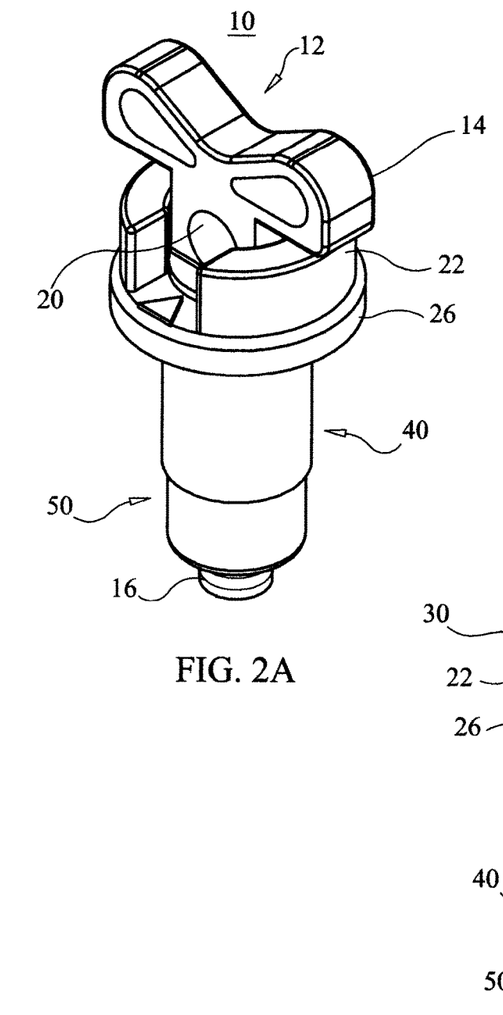
FIG. 2A is a downwardly angled perspective view of a completely assembled exemplar lockable hermetically sealable stopper as illustrated in FIG. 1A.
Figure 2B:
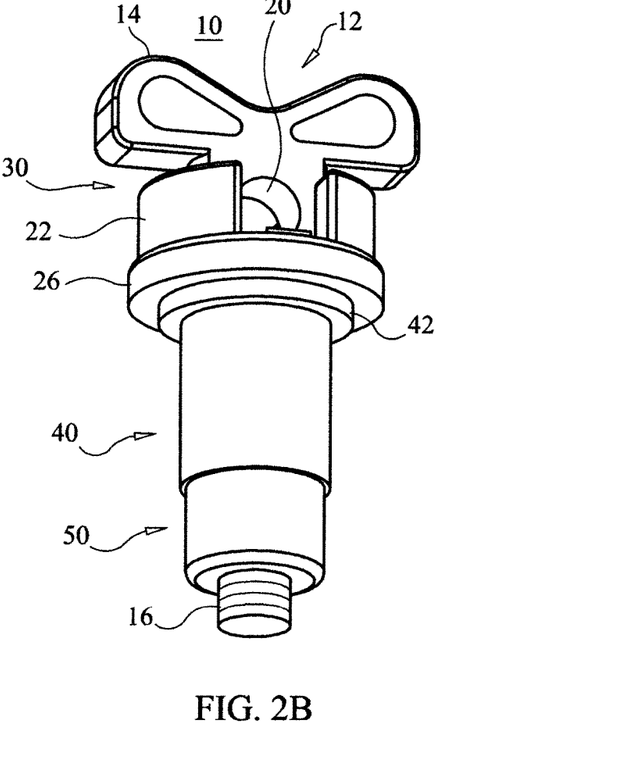
FIG. 2B is an upwardly angled perspective view of a completely assembled exemplar lockable hermetically sealable stopper as illustrated in FIG. 1A.
Figure 3A:
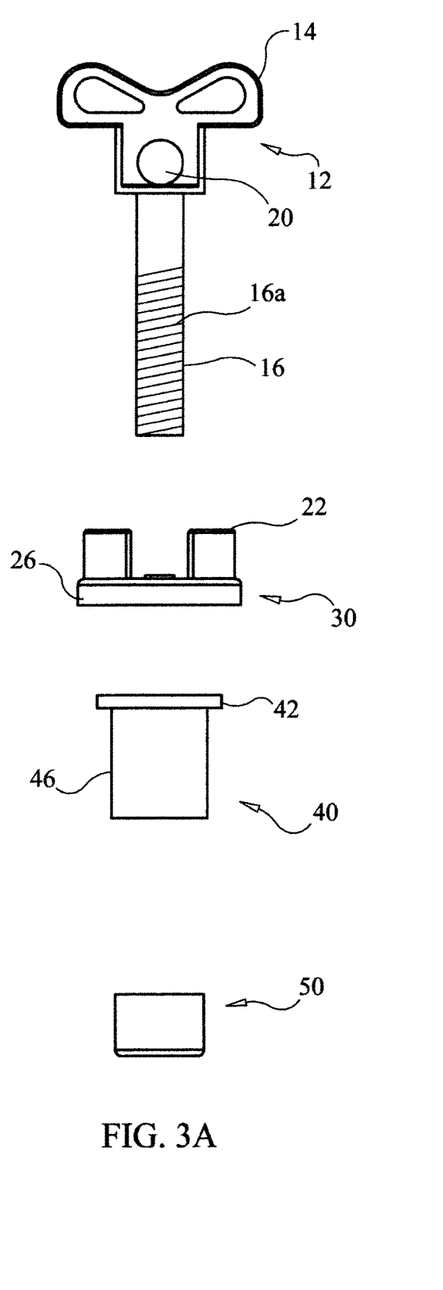
FIG. 3A is an exploded view of an exemplar lockable hermetically sealable stopper.
Figure 3B:
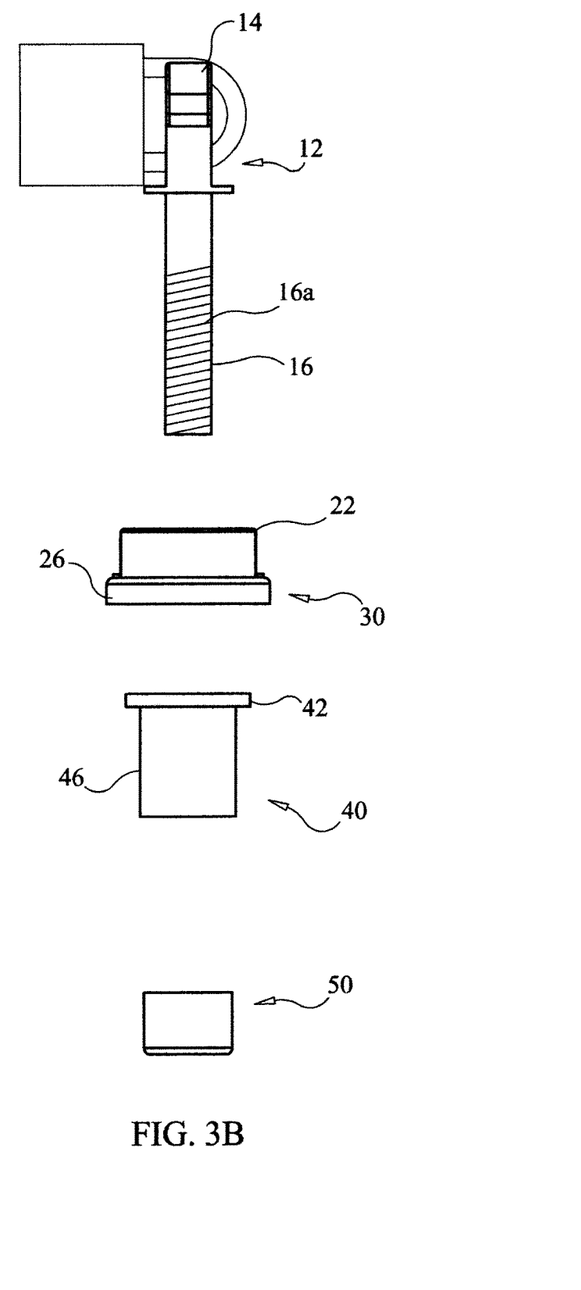
FIG. 3B is an exploded view of an exemplar lockable hermetically sealable stopper turned 90° from the view seen in FIG. 3A with a padlock in place.

FIGS. 2A and 2B, perspective views, illustrate, in more detail, spaced shoulders 22 of compression cap 30 extending upward from opposing edge portions of the upper surface of base plate 26. When positioned for locking, one of wings 14 of winged threaded bolt 12 extends over one of the two locking shoulders 22 of compression cap 30 while the other wing extends over the other locking shoulder. In the embodiment illustrated, shoulders 22 are manufactured integral with domed compression cap 30, such as by injection molding. Winged threaded bolt 12 is positioned for locking, when opening 20, through which the shackle of a padlock is inserted for locking, is fully accessible through the spaces between the shoulders 22. Dome 28 of domed capping compression cap 30 is raised only fractions of a millimeter and, at the scale the sealing stopper assembly is illustrated in FIGS. 1-6B, the dome is not easily visible. In FIG. 7 the doming is exaggerated and, thus, can be better appreciated. In the example illustrated, base plate 26 of compression cap 30 has axial bore 24 therethrough to receive threaded wing bolt 12 and an outer diameter greater than the surface of sealing gasket 40. It should be understood that base plate 26 of compression cap 30 may also have an outer diameter identical to the diameter of the surface of resilient elastomeric sealing gasket 40, if so desired.

FIGS. 3A-4B provide various exploded views of the individual parts of the plug so that detailed properties may be better appreciated, such as elastomeric compressible resilient sealing gasket 40 having resilient gasket sleeve 46 with gasket sleeve central opening 44 therethrough for receiving said winged threaded bolt 12. About the top end surface of sealing gasket 40 opposing the bottom surface of base plate 26 of compression cap 30 is flange 42. Flange 42 has an outer diameter greater than the diameter of aperture 24, which provides for two advantages. The first is that the size of the outer diameter of flange 42 provides for gasket 40 to extend its support of base plate 26 toward the outer rim of base plate 26, and secondly, but no less important, flange 42 provides for a compressible, moldable seal to form between compression cap 30 and gasket 40 (best seen in FIGS. 6a-7). The compressible sealing properties of flange 42 provides for flange 42 to deform itself to encase any irregularities that may be present on the surface of a rim of an opening to be sealed, ensuring the formation of a water and air-tight seal.

Sealing gasket 40 sits on compression base nut 50. Compression base nut 50 comprises axial bore 54 therethrough having internal threads 55. The embodiment illustrated has all parts of compression base nut 50 manufactured integrally, such as by a method of molding, such as injection molding. The upper surface of compression base nut 50 provides a supporting surface for gasket 40 especially while gasket 40 is under compression. Threads 55 are complementary to exterior threads 16*a* of winged threaded bolt 12 stem 16. It is the interaction of threads 16*a* with threads 55 that urges compression cap 30 and nut 50 toward one another to compress gasket 40 along the axis that extends through the length of opening 44. The compression of gasket 40 causes the gasket's width to increase. It is this increase of the gasket's width that provides for the stopper to form an airtight seal.

To achieve a seal using sealing stopper assembly 10, stem 16 of winged threaded bolt 12 is inserted sequentially into bore 24 of compression cap 30, opening 44 of gasket 40, and bore 54 of compression base nut 50 to provide for threads 16a to reach threads 55 that are structured to mate with threads 16a of stem 16. Once threads 16a and threads 55 are in contact, winged threaded bolt 12 is rotated toward the compression plate 26 for threads 16a of bolt 12 to mesh with complementary threads 55 inside borehole 54. At this point, plug 10 is ready for insertion into the bottle to be capped. Once the plug in position in the opening to be plugged, continued rotation of winged threaded bolt 12 will urge compression plate 26 and compression base nut 50 toward one another compressing and thus expanding, gasket 40. The expansion of gasket 40, formed by compressing compression cap 30 and compression base nut 50, is illustrated in FIG. 7.

Figure 5A:
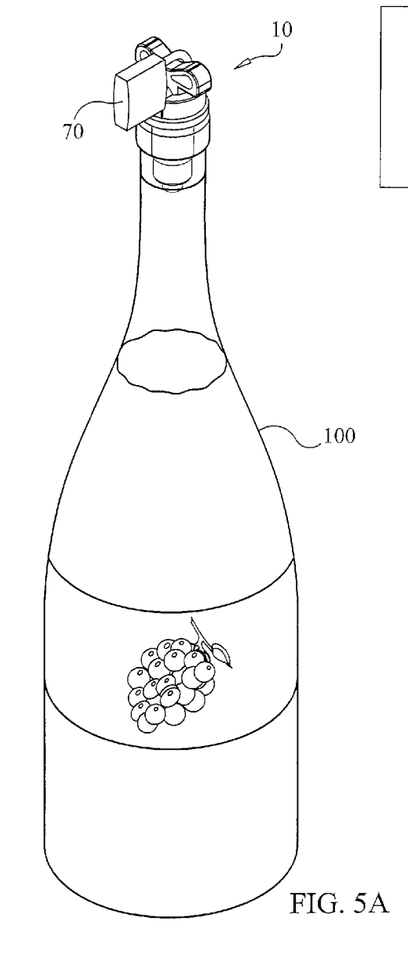
FIG. 5A is a perspective view of an exemplar lockable hermetically sealable stopper with lock in use in a bottle.
Figure 5B:
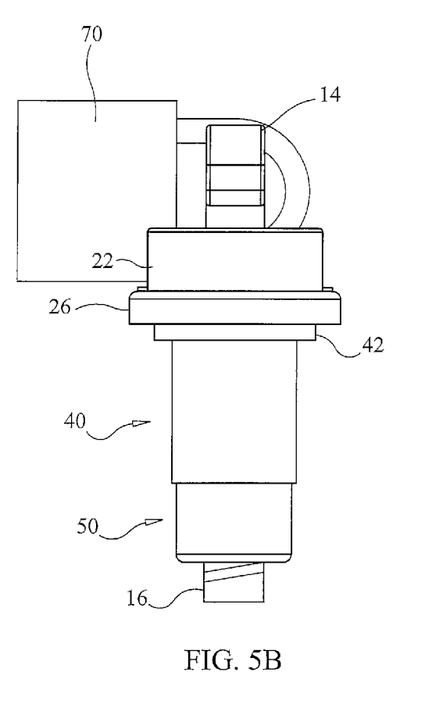
FIG. 5B is an elevation view of a completely assembled exemplar lockable hermetically sealable stopper with locking means.

FIG. 5A illustrates stopper 10 in use sealing bottle 100. Once stopper 10 is in bottle 100 and its seal formed, the stopper is locked by inserting the shackle of padlock 70 through opening 20 of winged threaded bolt 12 and then putting the shackle in place in the padlock to securely lock stopper 10 in place to keep the contents, such as an alcoholic beverage, unavailable for unpermitted use. Additionally, the seal is hermetic keeping the contents fresh and protected from evaporation. Having locking aperture 20 of wing bolt 12 centered between grasping wings 14 provides for greater stability for an upright, locked bottle. FIG. 5B provides an enlarged elevation illustration of padlock 70 in a locked state in stopper 10.

Expanding gas, liquid, or other forces cannot dislodge locked, compressible stopper assembly according to the principles of the present invention from an opening it is sealing. The elastomeric, resilient, compressible sealing gasket form is able to form a hermetic seal with an opening even if the opening is threaded. The gasket is made of material that is conformable to the spaces inherent in a threaded surface.

Figure 6A:
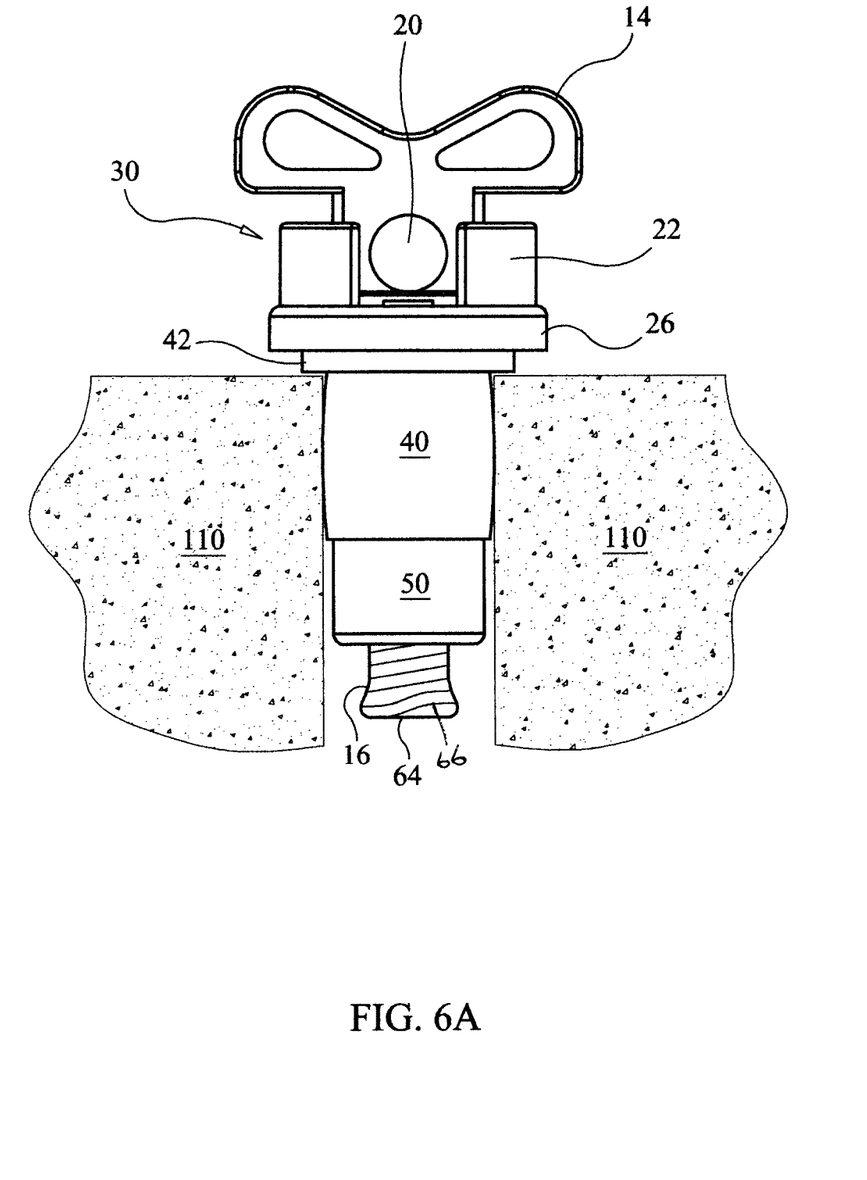
FIG. 6A is an elevation view of an exemplar lockable hermetically sealable stopper situated for sealing a borehole.
Figure 6B:
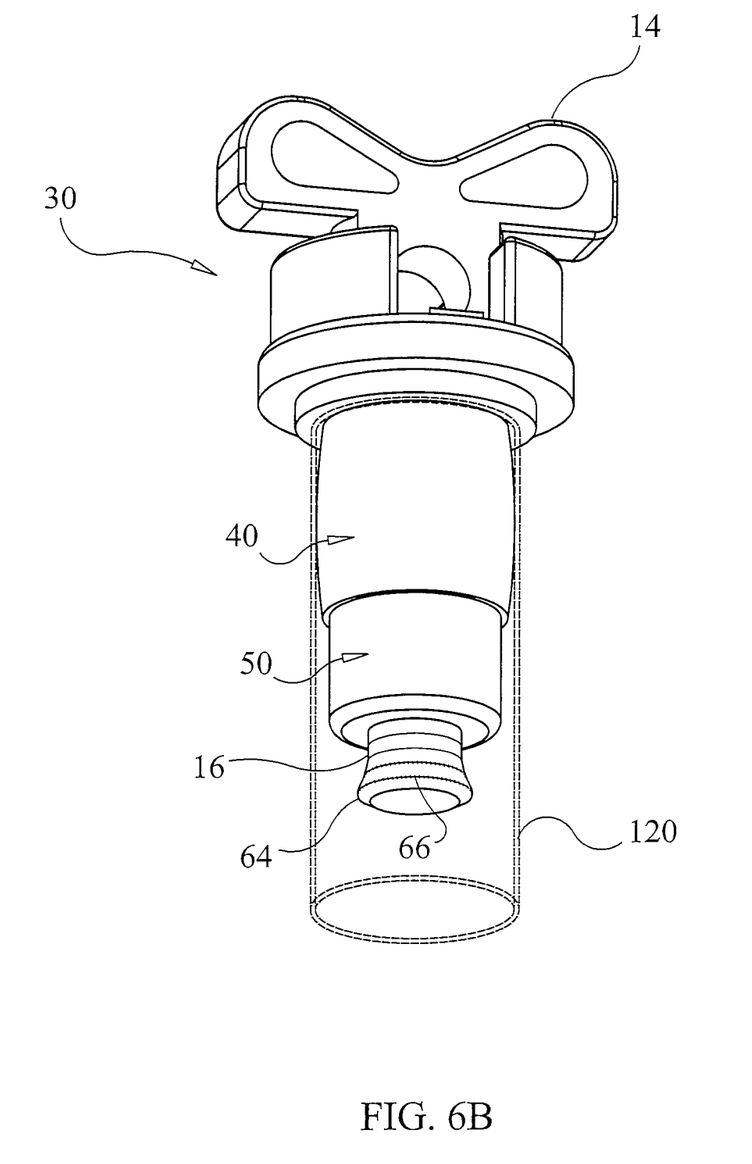
FIG. 6b is a perspective view of an exemplar lockable hermetically sealable stopper situated for sealing an opening of a pipe.
Figure 7:
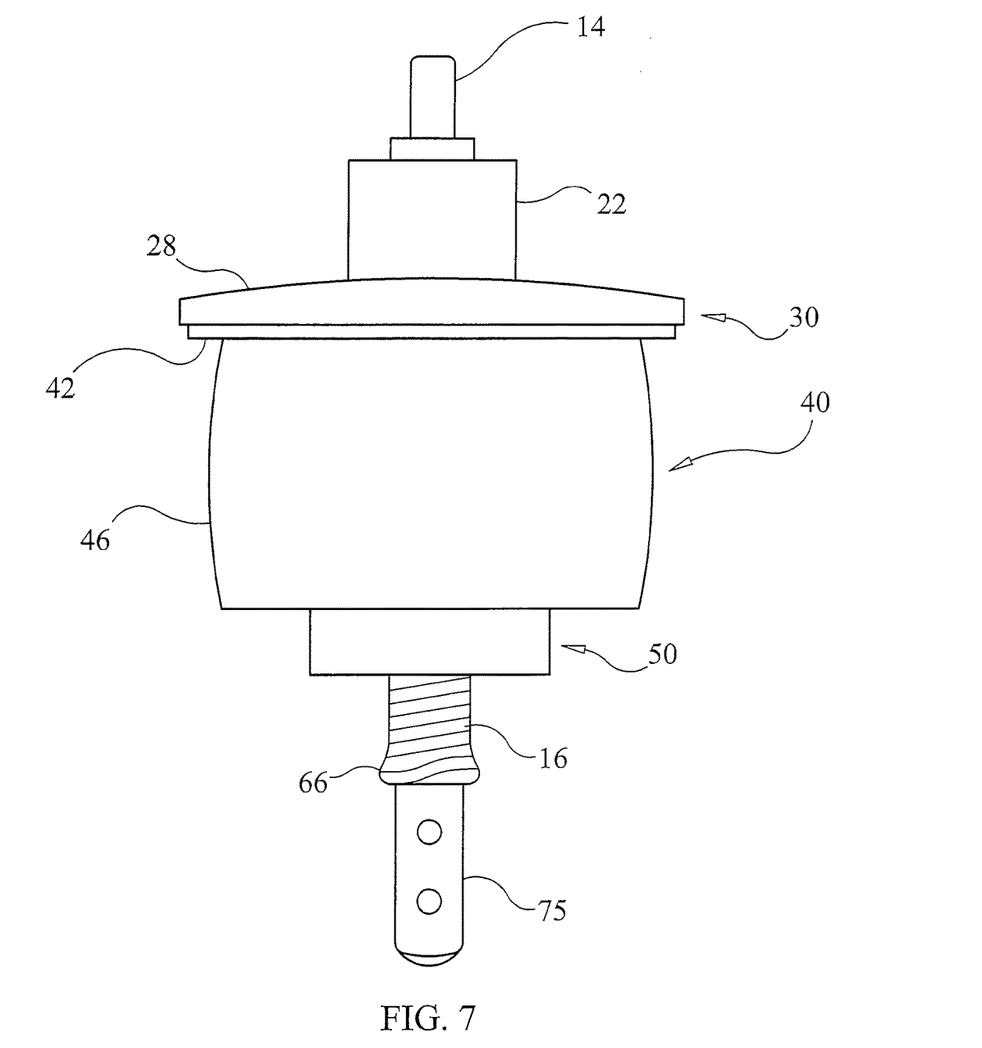
FIG. 7 is an elevation view of an exemplar lockable hermetically sealable stopper in compressed mode.

FIG. 6A illustrates compressible sealing gasket 40 providing a hermetic seal in bore in concrete. This example of the plug sealing an opening in concrete is only one of many situations in which the stopper of the present invention may be used in addition to sealing a bottle opening. Just as when the stopper is used to seal and lock a bottle opening, stopper 10 may be easily locked by inserting the shackle of a padlock through the aperture 20. FIG. 6A also illustrates one way that stem 16 is prevented from being removed from the stopper once it is inserted sequentially through bore 24 of compression cap 30, opening 44 of gasket 40, and borehole 54 of compression base nut 50. In this example, the end portion 64 of stem 16 is enlarged to provide the same securing-in-place action that is provided by the shape of an arrow. FIG. 6B illustrates how the compression of sealing gasket 40 cause the expansion of the gasket. Also shown is one way to prevent stem 16 from being removed from the stopper once it is inserted sequentially through bore 24 of compression cap 30, opening 44 of gasket 40, and borehole 54 of compression base nut 50. In this instance, threads 66 of end portion of stem 16 are distorted so that they will no longer interact with the threads in the borehole 55, which is also illustrated in FIG. 1B. Other ways of shaping the end of stem 16 to prevent its removal from the plug are included in the inventive principles, such as adding a nut to the bottom of the stem.

FIG. 7 provides an exaggerated example of dome 28 of domed compression cap 30. FIG. 7 also illustrates optional tethering device 75. The tethering device is useful for tying a string, or the like, into the apertures of the device so that the stopper may be hung from a rack for air-drying or storage.

The preferred lockable stopper assembly body, comprising winged threaded bolt 12, compression cap 30, and base compression nut 50, is reusable. Sealing stopper assembly body is easily and inexpensively manufactured by injection molding using a variety of thermoplastics, including, but not limited to, polyvinyl chloride, Teflon, Nylon and glass filled Nylon, Valox and glass filled Valox. Resilient elastomeric sealing gasket 40 is easily and inexpensively manufactured by injection molding using a variety of thermoplastic materials having appropriate properties, such as hardness, resiliency, resistance to heat and cold, and resistance to the corrosive effect of certain liquids. The thermoplastics that can be used, include, but not limited to, Santoprene, natural or man-made rubber, Viton and Buna Nitrile. The preferred embodiment of gasket 40 was manufactured with the required hardness as measured by a durometer, wall thickness, and length to obtain maximum compression and to achieve the maximum contact area between sleeve 46 of gasket 40 and the interior surface of the device whose opening is to be sealed in order to ensure the formation of a hermetic seal and to prohibit the sealing stopper assembly from becoming dislodged from forces incurred during use. Compressible sealing stopper assemblies made according to this invention may be of any suitable size and configuration required to achieve a hermetic seal with an opening in a part, as required or desired.

Sealing stopper 10 cannot be removed until winged threaded bolt 12 is rotated away from the compression plates to reduce the compressive force on the gasket. And winged threaded bolt 12 cannot be rotated until the lock is removed from the opening in the bolt. This means that neither pressures from the inside of the sealed container, such as those produced by the expansion of heated gas, nor pulling pressure from the outside can result in removing the stopper.

There are, of course, many other openings that can use an air-tight, lockable stopper, in addition to bottles. Plumbers require sealing stoppers when testing for leaks in drain and vent pipes and in the pipe connections of a plumbing system. Containers carrying toxic materials require lockable stoppers that will prevent the deliberate or accidental removal of the contents and that will not allow the material to leak out of the container, especially during shipping. There are times when an air-tight, lockable stopper is required only for a one-time or occasional use. For example, the coating industry must often apply a coating to parts, such as to the outside surfaces of piping, when the coating must not contact the internal surface of the pipes. For example, when the coating would be incompatible with the fluids or gases that will come into contact with the internal surface area of the pipe, the internal surfaces of the pipe must be sealed off during the coating procedure. Thus, there is a need for sealing means to mask or to close such pipe openings to prevent coating material from coming into contact with the interior pipe surfaces. Environmental ground water monitoring requires not only tight sealing stoppers, but also stoppers that have the ability to be locked. When a spill is reported by a gas station, such as a leakage of gasoline from the station's underground gasoline storage tanks, for example, environmental regulations now require that monitoring wells be installed in the area of concern. The wells are used to collect ground water samples to first determine the extent of the spill and, subsequently, to monitor the success of the clean-up efforts or of the containment program. Once a monitoring well is put into place, ground water samples are regularly collected from each well for testing to see if the contaminant is still present in the ground water that flows into that well. It is well-accepted that this system works well, but only, of course, as long as no extraneous contaminate is allowed to enter into the monitoring wells. Often a monitoring well is placed in an area of heavy vehicular traffic. If a near-surface or below-ground monitoring well is left uncapped, it is easy to understand how gasoline, accidentally spilled onto the ground surface by a consumer filling his gas tank, could migrate into the monitoring well. Thus, when a sample of water from that well is tested, the results would show the presence of gasoline in the groundwater, but there is no way to determine whether the gasoline had entered the well in ground water that was contaminated with gasoline from a leaking storage tanks or if the gasoline came from a small amount of surface run-off. Thus, monitoring wells need to be capped to keep contaminants from entering the well. Contamination can occur even when the well is capped. For instance, when the driver of a gasoline delivery truck mistakes the monitoring well inlet for a gas storage tank inlet and pumps the gasoline into the monitoring well. Such a mistake can lead to grave consequences as the gasoline mistakenly pumped into the monitoring well will quickly migrate away from the monitoring well and enter the ground water. Sometimes the introduction of a contaminant into a monitoring well is deliberate. In either case, deliberate contamination can destroy, at least a part of if not all of, a monitoring well program and could be prevented by the use of a hermetically sealed well cover that can be locked.

The foregoing description, for purposes of explanation, used specific and defined nomenclature to provide a thorough understanding of the invention. However, it will be apparent to one skilled in the art that the specific details are not required in order to practice the invention. Thus, the foregoing descriptions of the specific embodiment of the lockable compression stopper are presented for purposes of illustration and description. They are not intended to be exhaustive or to limit the invention to the precise forms disclosed. Those skilled in the art will recognize that many changes may be made to the features, embodiments, and methods of making the embodiments of the invention described herein without departing from the spirit and scope of the invention. Furthermore, the present invention is not limited to the described methods, embodiments, features or combinations of features but include all the variation, methods, modifications, and combinations of features within the scope of the appended claims. The invention is limited only by the claims.

What is claimed is:

1. A lockable compression plug for hermetically sealing an opening in a part, comprising only:
   a threaded wing bolt,
   a compression cap,
   a sealing gasket,
   a compression base plate,
   said threaded wing bolt having grasping wings at a first end and an opening therethrough and a stem at a second end, providing for
   said threaded wing bolt to be inserted through:
      said compression cap, said compression cap having a set of opposing spaced shoulders on a first surface and an axial bore therethrough to receive said threaded wing bolt,
      said sealing gasket, said sealing gasket having a central opening therethrough for receiving said winged threaded bolt, and
      said compression base, said compression base plate having a threaded axial bore for mating with the threads of said threaded wing bolt;
   wherein after said plug is inserted into said opening in a part, and said threaded wing bolt is further rotated through said threaded axial bore urging said compression cap and said compression base toward one another compressing said gasket causes said gasket to deform radially outward providing a hermetic seal in said opening in a part, and
   wherein said opening therethrough said threaded wing bolt is structured to receive a shackle of a padlock wherein after said plug is inserted into said opening in a part, said shackle of said padlock is inserted into said opening therethrough a threaded wing bolt part that extends downward from the area central to said grasping wings, and said padlock is locked, said set of opposing spaced shoulders precludes rotation of the winged threaded bolt securing said plug in said opening in a part.

2. The lockable compression plug, as recited in claim 1, wherein said compression cap is domed.

3. The lockable compression plug, as recited in claim 1, wherein said compression cap has an outer diameter greater than said opening to be sealed.

4. The lockable compression plug, as recited in claim 1, wherein a flange of said sealing gasket has a first side, said first flange side positioned adjacent to a second side of said compression cap, said flange having an outer diameter greater than said opening to be sealed.

5. The lockable compression plug, as recited in claim 1, wherein said sealing gasket comprises an elongate sleeve body, wherein said body has an outer diameter selected for complemental fitting of said gasket body inside said opening to be sealed.

6. The lockable compression plug, as recited in claim 1, wherein said threaded wing bolt has distorted threads at the end of said bolt, said distorted threads incapable of interaction with the interior threads of said base plate bore.

7. The lockable compression plug, as recited in claim 1, wherein said lockable compression plug is reusable.

8. The lockable compression plug, as recited in claim 1, wherein said opening in a part is an opening in a bottle.

9. A lockable sealing stopper for hermetically sealing a bottle opening, comprising:
   a reusable, stopper assembly comprising only:
      a winged threaded bolt (12) having:
         wings (14) for grasping at a first end,
         a stem (16) with external threads (16a) at said second end, and
         an opening (20) therethrough between said first and second ends;
      a domed, locking compression cap (30) having
         an axial bore (24) there-though
         and
         a set of opposing spaced shoulders (22) on a first surface;
      a sealing gasket (40) having an axial bore (44) therethrough, and
      a compression base plate (50) having a bore (54) therethrough, said base plate bore having internal threads (55),
   with said winged threaded bolt inserted through said cap bore (24) then into said gasket opening (44) and further rotated into said base plate bore 54, said external threads (16a) of said stem to mate with said internal threads (55) of said base plate bore, so that after a plug is inserted into a bottle opening continued rotation of winged threaded bolt will urge said compression cap (30) and base plate (50) toward one another compressing and expanding said sealing gasket (40) causing a hermetic seal of the bottle opening, wherein said opening therethrough said threaded wing bolt is structured to receive a shackle of a padlock wherein after said plug is inserted into said opening in a part, said shackle of said padlock is inserted into said opening therethrough a threaded wing bolt part that extends downward from the area central to said grasping wings, and said padlock is locked, said set of opposing spaced shoulders precludes rotation of the winged threaded bolt securing said plug in said bottle opening.

10. The lockable sealing stopper, as recited in claim 9, wherein the compression cap is domed.

11. The lockable sealing stopper, as recited in claim 9, wherein said compression cap has an outer diameter greater than said opening to be sealed.

12. The lockable sealing stopper, as recited in claim 9, wherein a flange of said sealing gasket has a first side, said first flange side positioned adjacent to a second side of said compression cap, said flange having an outer diameter greater than said opening to be sealed.

13. The lockable sealing stopper, as recited in claim 9, wherein said sealing gasket comprises an elongate sleeve body, wherein said body has an outer diameter selected for complemental fitting of said gasket body inside said opening to be sealed.

14. The lockable sealing stopper, as recited in claim 9, wherein said threaded wing bolt has distorted threads at the end of said bolt, said distorted threads incapable of interaction with the interior threads of said base plate bore.

15. The lockable sealing stopper as recited in claim 9, wherein said lockable compression plug is reusable.

16. A method for hermetically sealing an opening in a part using a lockable sealing stopper, comprising the steps of:

providing only:

a threaded wing bolt a compression cap, a sealing gasket, and a compression base;

said threaded wing bolt having an opening therethrough, said bolt being inserted through:

said compression cap having a set of opposing spaced shoulders on a first surface and an axial bore therethrough to receive said threaded wing bolt, said sealing gasket having a central opening therethrough for receiving said winged threaded bolt, and said compression base plate having a threaded axial bore for mating with the threads of said threaded wing bolt;

wherein after said plug is inserted into said opening in a part, said threaded wing bolt is further rotated through said threaded axial bore urging said compression cap and said compression base plate toward one another compressing said gasket causing said gasket to deform radially outward providing a hermetic seal in said opening in a part and further comprising the steps of:

providing a shackle to be inserted into said opening through a threaded wing bolt part that extends downward from the area central to said grasping wings, wherein when said padlock is locked, said set of opposing spaced shoulders precludes rotation of the winged threaded bolt securing said plug in said opening in a part.

17. The method for hermetically sealing an opening in a part using a lockable sealing stopper, as recited in claim 16, wherein said compression cap is domed.

\* \* \* \* \*